(12) United States Patent
Kawamura et al.

(10) Patent No.: US 11,398,646 B2
(45) Date of Patent: Jul. 26, 2022

(54) METHOD FOR MANUFACTURING SOLID-STATE BATTERY AND SOLID-STATE BATTERY

(71) Applicant: Honda Motor Co.,Ltd., Tokyo (JP)

(72) Inventors: Soshi Kawamura, Saitama (JP); Wataru Shimizu, Saitama (JP); Ushio Harada, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 281 days.

(21) Appl. No.: 16/853,720

(22) Filed: Apr. 20, 2020

(65) Prior Publication Data

US 2020/0343592 A1 Oct. 29, 2020

(30) Foreign Application Priority Data

Apr. 26, 2019 (JP) .............................. JP2019-086615

(51) Int. Cl.
*H01M 10/0585* (2010.01)
*H01M 4/04* (2006.01)

(52) U.S. Cl.
CPC ..... *H01M 10/0585* (2013.01); *H01M 4/0416* (2013.01)

(58) Field of Classification Search
CPC ........................ H01M 4/0416; H01M 10/0585
USPC ....................................................... 429/162
See application file for complete search history.

(56) References Cited

U.S. PATENT DOCUMENTS

| 2015/0010804 A1* | 1/2015 | Laramie | H01M 50/446 429/144 |
| 2016/0093916 A1* | 3/2016 | Moon | H01M 10/0565 429/317 |

FOREIGN PATENT DOCUMENTS

| JP | 2000311712 | 11/2000 |
| JP | 2004311351 | 11/2004 |
| JP | 2007087758 | 4/2007 |
| JP | 2010040218 | 2/2010 |
| JP | 2011249260 | 12/2011 |
| JP | 2014026747 | 2/2014 |
| JP | 2015153663 | 8/2015 |

OTHER PUBLICATIONS

"Office Action of Japan Counterpart Application" with English translation thereof, dated Apr. 5, 2022, p. 1-p. 6.

* cited by examiner

*Primary Examiner* — James M Erwin
(74) *Attorney, Agent, or Firm* — JCIPRNET

(57) ABSTRACT

A method for manufacturing a solid-state battery includes: an electrode material filling step of filling a plurality of holes of a porous conductive base material with an active material contained in an electrode slurry so as to form a first electrode body, by dipping the porous conductive base material having the plurality of holes into the electrode slurry; a solid electrolyte material coating step of coating a surface with a solid electrolyte material contained in a solid-electrolyte slurry by dipping at least one of the first electrode body or a second electrode body having a polarity different from that of the first electrode body into the solid-electrolyte slurry; and a solid-state battery laminating step of obtaining a solid-state battery by laminating and pressing the first electrode body and the second electrode body.

7 Claims, 7 Drawing Sheets

METHOD FOR MANUFACTURING SOLID-STATE BATTERY AND SOLID-STATE BATTERY

CROSS-REFERENCE TO RELATED APPLICATION

This application claims the priority benefit of Japan application serial no. 2019-086615, filed on Apr. 26, 2019. The entirety of the above-mentioned patent application is hereby incorporated by reference herein and made a part of this specification.

BACKGROUND OF THE DISCLOSURE

Technical Field

The disclosure relates to a method for manufacturing a solid-state battery and the solid-state battery.

Related Art

In recent years, various large and small electrical and electronic devices such as an automobile, a personal computer, and a mobile phone are widely used, and accordingly there is rapid growth of a demand for a high-capacity and high-power battery. For example, a solid-state battery having a solid electrolyte material is more excellent in that safety improves because an electrolyte is non-flammable and higher energy density is obtained, compared with a conventional battery having an organic electrolytic solution as an electrolyte, and the solid-state battery currently attracts attention (for example, see patent literature 1: Japanese Patent Laid-Open No. 2014-026747).

A solid-state battery is configured of a laminate in which a positive-electrode layer, a solid-electrolyte layer, and a negative-electrode layer are laminated. When interfaces between the electrode layers and the solid-electrolyte layer are insufficiently bonded, interface resistance increases, and characteristics as a solid-state battery is deteriorated. In this respect, patent literature 2 (Japanese Patent Laid-Open No. 2010-040218) discloses a porous metal sheet and an electrode material sheet (electrode layer) obtained by inserting a solid electrolyte into hole portions of the porous metal sheet.

The electrode material sheet (electrode layer) is considered to be capable of inhibiting the electrode material from having defects or cracks and from peeling from a current collector and, further, to improve contact properties between the current collector and the electrode material and thereby to improve handleability or continuous productivity in a manufacturing process.

However, the electrode material sheet described in patent literature 2 is manufactured by laminating a solid-electrolyte layer separately. Therefore, when the interface between the electrode material sheet and the solid-electrolyte layer is insufficiently bonded, interface resistance increases, and a problem of deterioration of characteristics as a solid-state battery is not solved.

The disclosure provides a method for manufacturing a solid-state battery by which it is possible to manufacture a solid-state battery in simpler steps than a conventional technique and by which it is possible to effectively prevent shorting of the solid-state battery.

Through a comprehensive study for solving the problem described above, the inventors have found that it is possible to solve the above problem as long as a method for manufacturing a solid-state battery includes an electrode material filling step and a solid electrolyte material coating step, thereby completing the disclosure.

SUMMARY

The disclosure provides a method for manufacturing a solid-state battery, the method including: an electrode material filling step of filling a plurality of holes of a porous conductive base material with an active material contained in an electrode slurry so as to form a first electrode body, by dipping the porous conductive base material having the plurality of holes into the electrode slurry; a solid electrolyte material coating step of coating a surface with a solid electrolyte material contained in a solid-electrolyte slurry by dipping at least one of the first electrode body or a second electrode body having a polarity different from that of the first electrode body into the solid-electrolyte slurry; and a solid-state battery laminating step of obtaining a solid-state battery by laminating and pressing the first electrode body and the second electrode body.

The disclosure provides a solid-state battery in which a first electrode body and a second electrode body having a polarity different from that of the first electrode body are laminated, both surfaces of at least one of the first electrode body or the second electrode body in a lamination direction are coated with a solid electrolyte material, and the first electrode body contain a porous conductive base material having a plurality of holes and an active material filled into the plurality of holes.

Figure 3:
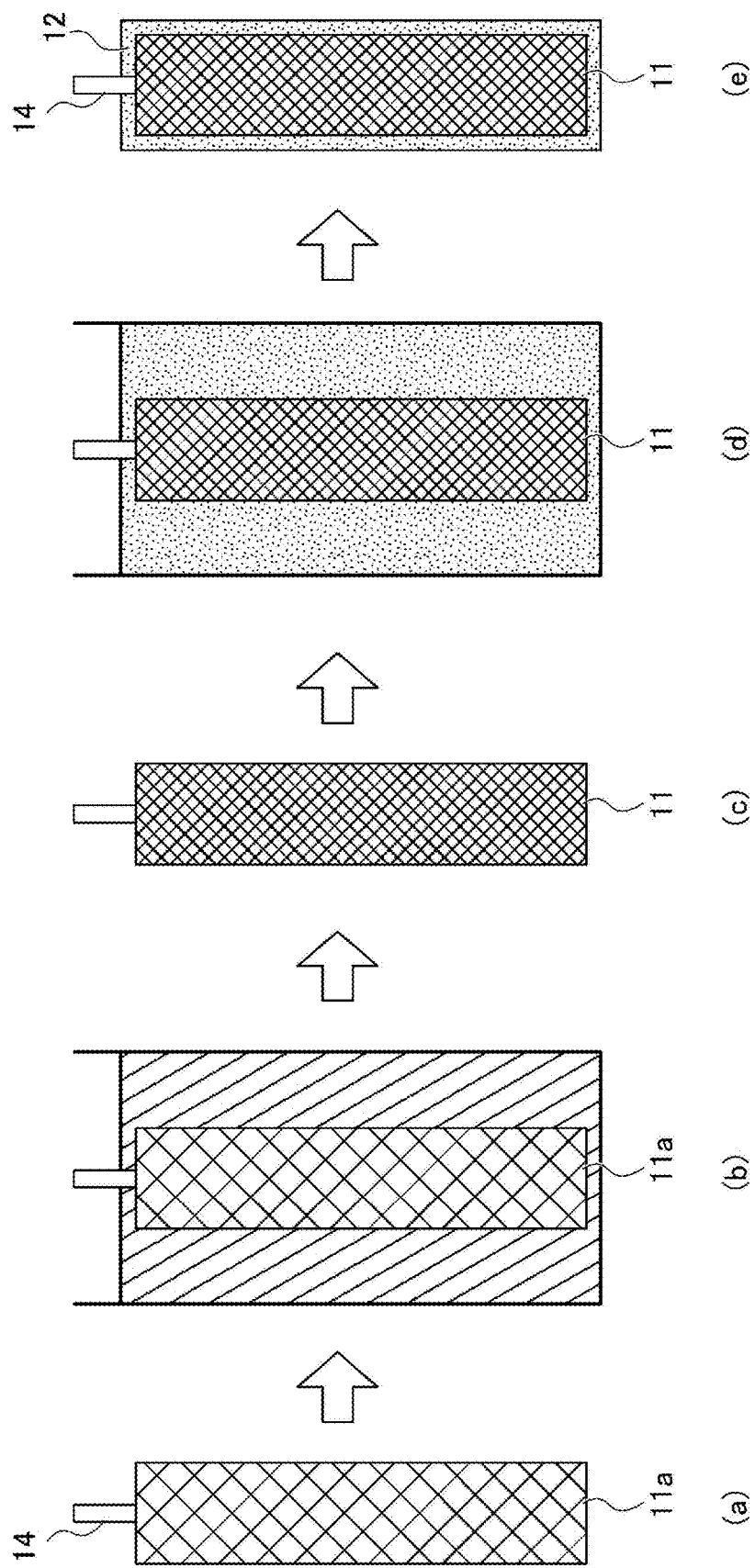

(a) to (e) of FIG. 3 is a view schematically illustrating a mode of dipping in an electrode material filling step and a solid electrolyte material coating step according to the disclosure.

Figure 4:
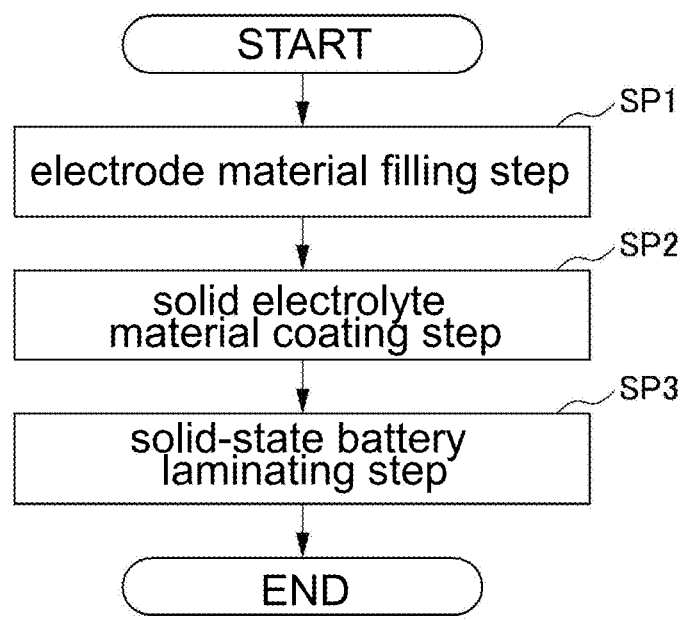

FIG. 4 is a flowchart of steps of a method for manufacturing a solid-state battery of the disclosure.

Figure 5:
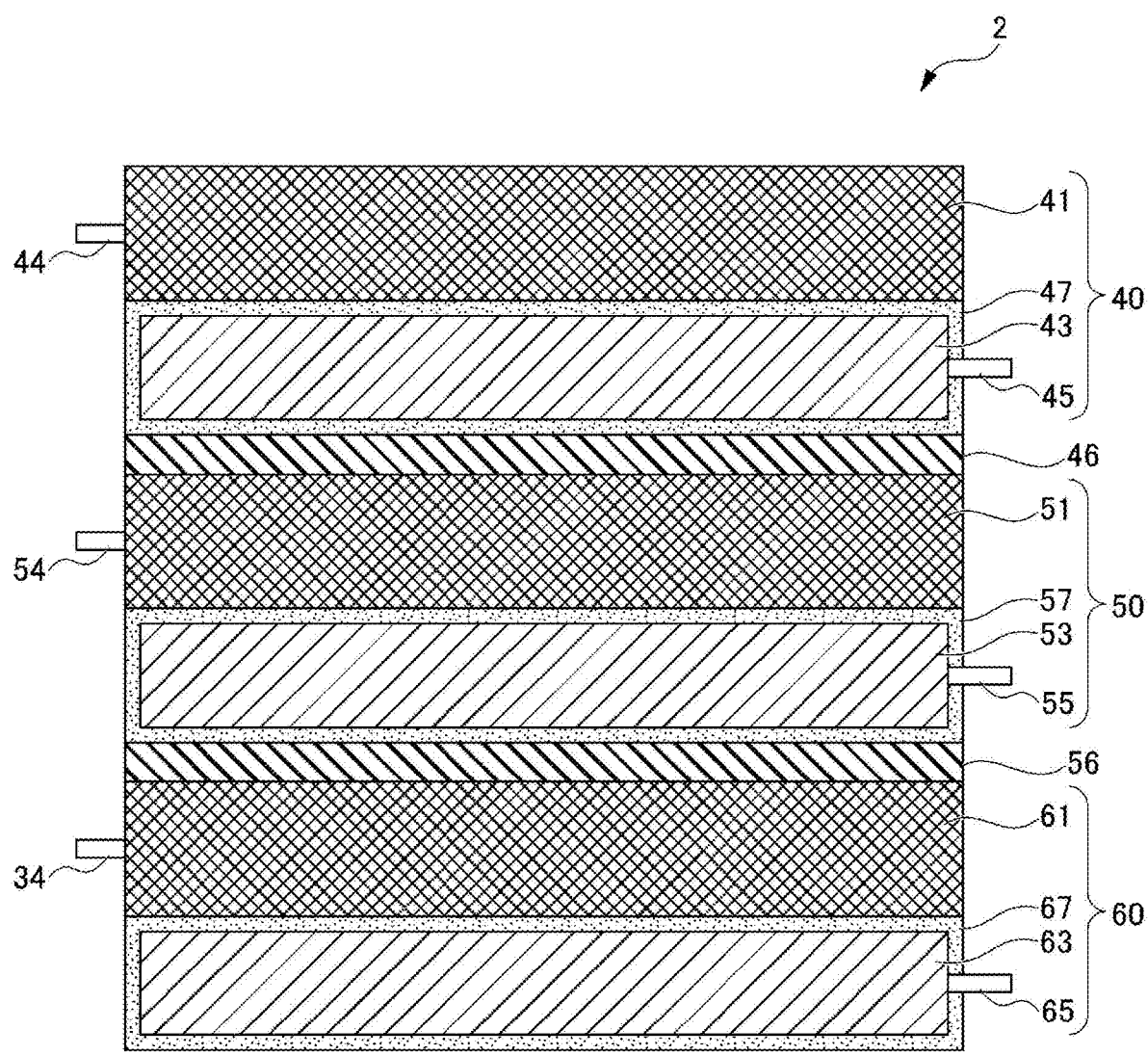

FIG. 5 is a cross-sectional view illustrating an overview of a solid-state battery 2 according to a second embodiment of the disclosure.

Figure 6:
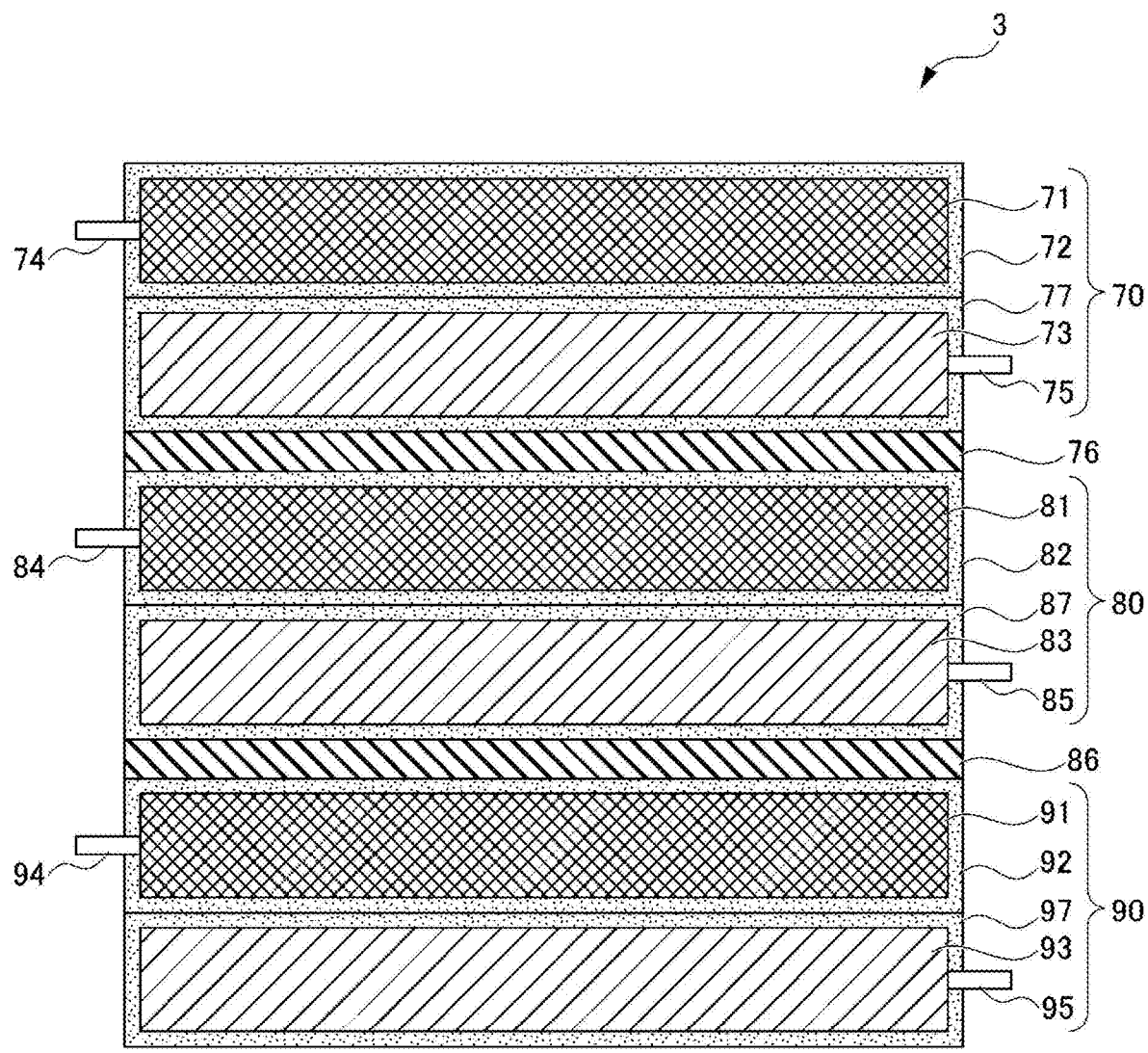

FIG. 6 is a cross-sectional view illustrating an overview of a solid-state battery 3 according to a third embodiment of the disclosure.

Figure 7:
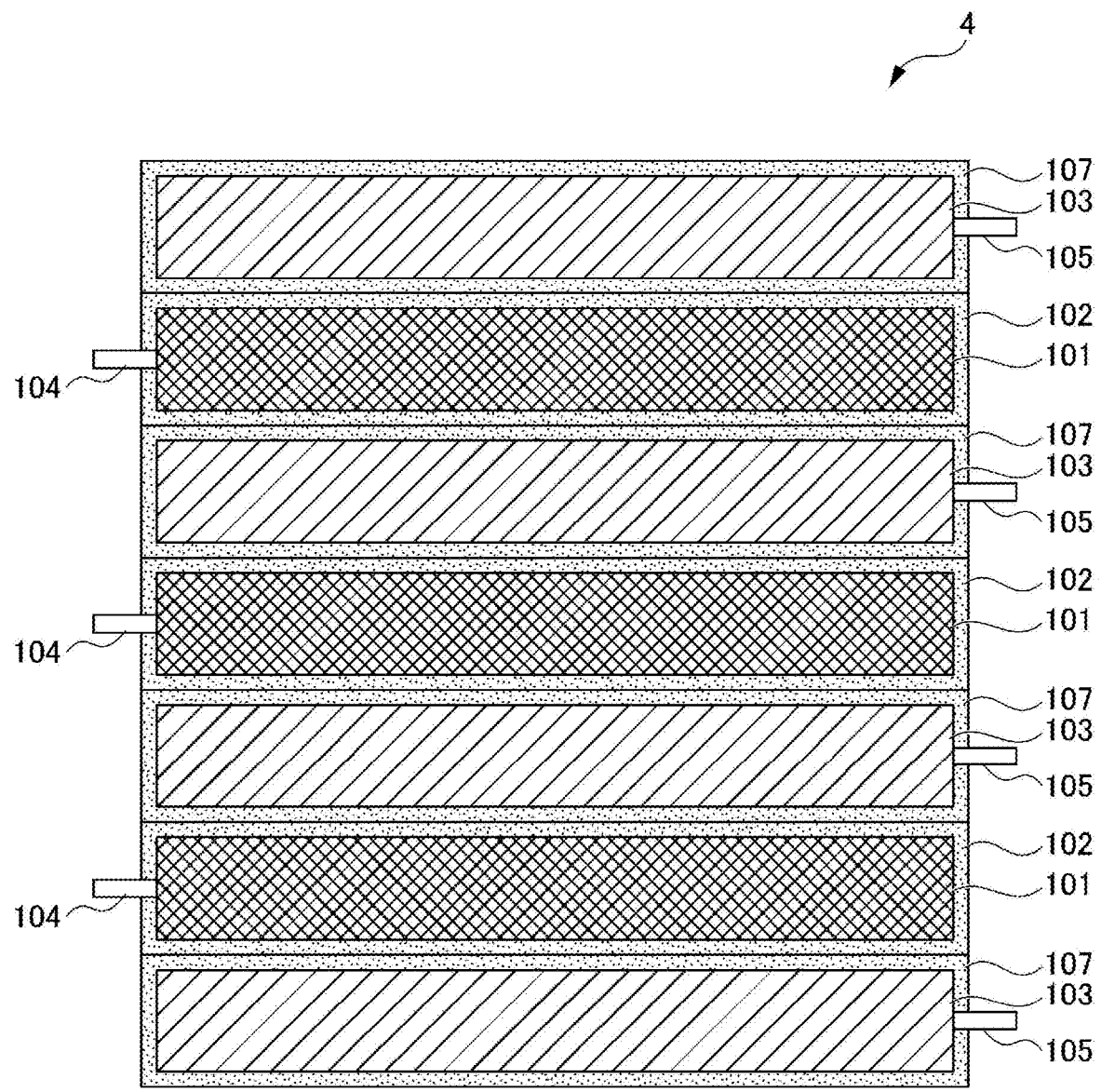

FIG. 7 is a cross-sectional view illustrating an overview of a solid-state battery 4 according to a fourth embodiment of the disclosure.

DESCRIPTION OF THE EMBODIMENTS

Hereinafter, specific embodiments of the disclosure are described in detail; however, the disclosure is not limited to the following embodiments at all and can be implemented with appropriate modifications within a range of the object of the disclosure.

<Method for Manufacturing Solid-State Battery of First Embodiment>

Figure 1:
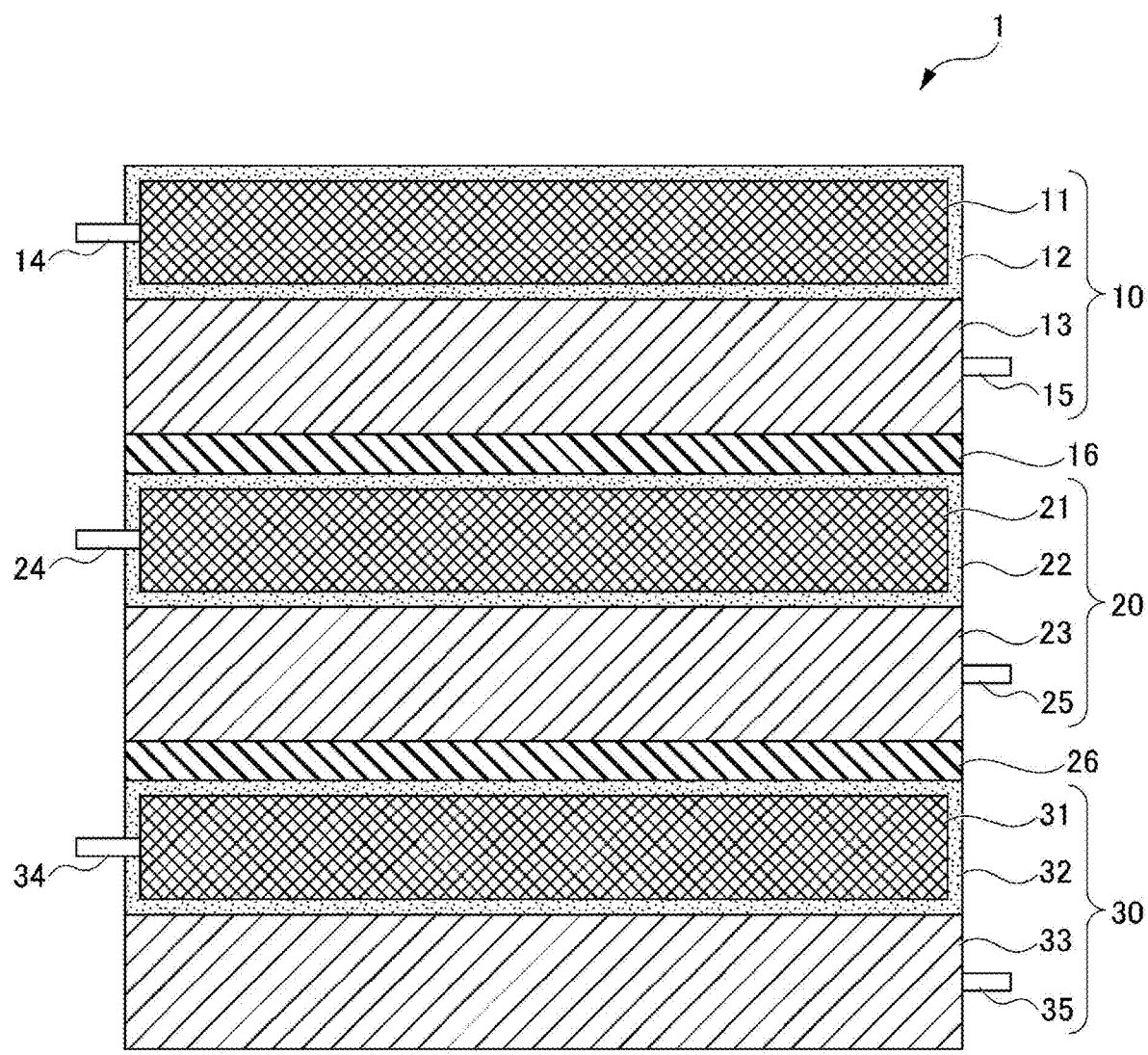
FIG. 1 is a cross-sectional view illustrating an overview of a solid-state battery 1 according to a first embodiment of the disclosure.

FIG. 1 is a cross-sectional view illustrating an overview of a solid-state battery 1 according to this embodiment. The solid-state battery 1 includes three solid-state battery cells 10, 20, and 30 which are laminated, and insulators 16 and 26 are laminated between the solid-state battery cells 10, 20, and 30. A plurality of solid-state battery cells 10, 20, and 30 are laminated, and thereby it is possible to obtain the solid-state battery 1 having high output.

Besides, a method for manufacturing a solid-state battery according to the embodiment is a manufacturing method including (1) electrode material filling step, (2) solid electrolyte material coating step, and (3) solid-state battery laminating step (see FIG. 4). The method for manufacturing a solid-state battery according to the embodiment includes the above steps, and thereby it is possible to manufacture the solid-state battery in simple steps, and it is possible to effectively prevent shorting of the solid-state battery.

Moreover, in the method for manufacturing a solid-state battery according to the embodiment, a first electrode body is described as a positive electrode body, and a second electrode body is described as a negative electrode body. However, the method for manufacturing a solid-state battery according to the disclosure is not limited to this mode. For example, the first electrode body may be described as the negative electrode body, and the second electrode body is described as the positive electrode body. Hereinafter, the steps are described.

<Electrode Material Filling Step>

Figure 2:
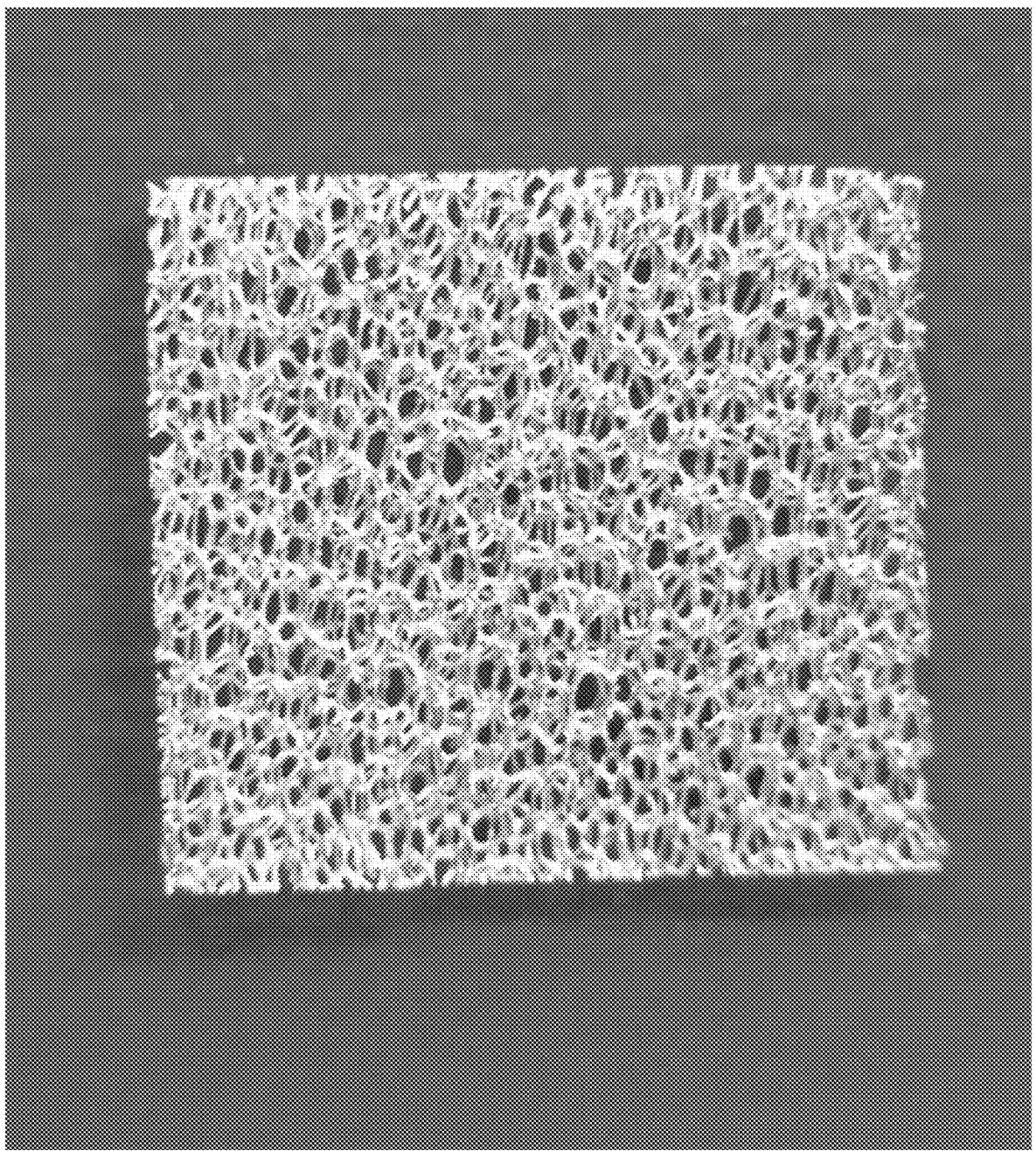
FIG. 2 is a photograph of a porous conductive base material according to the disclosure.

FIG. 2 illustrates a photograph of a porous conductive base material in this step. In this step, a porous conductive base material 11a (see (a) of FIG. 3) is dipped in positive-electrode slurry (electrode slurry) (see (b) of FIG. 3) to attach the positive-electrode slurry (electrode slurry) into voids of the porous conductive base material and fill the voids with a positive-electrode active material (active material) contained in the positive-electrode slurry (electrode slurry). The porous conductive base material has a plurality of holes, and thus surface tension of the positive-electrode slurry (electrode slurry) causes the positive-electrode slurry to come into close contact with the porous conductive base material. The method for manufacturing a solid-state battery according to the embodiment is a very simple method in which the porous conductive base material is dipped into the positive-electrode slurry (electrode slurry) and the method is characterized in that it is possible to fill the porous conductive base material with positive-electrode active material (active material).

In addition, a positive electrode body (first electrode body) obtained by filling the voids with the positive-electrode active material (active material) has a larger contact area between the porous conductive base material and the positive-electrode active material (active material), compared with a case where the positive-electrode active material is applied on a common film-like metal sheet. Therefore, it is possible to effectively prevent shorting of the solid-state battery.

The shape of the porous conductive base material is not particularly limited as long as the conductive base material is a so-called porous body having a plurality of holes; however, a three-dimensional network structure may be used. The porous conductive base material is easily deformed in a thickness direction of the first electrode body, and flexibility improves.

A material of the porous conductive base material may include a material of a current collector of a conventional positive electrode. Examples of the material can include aluminum, an aluminum alloy, stainless steel, nickel, iron, titanium, and the like; in particular, aluminum, the aluminum alloy, and stainless steel (SUS304, SUS316, SUS316L, or the like) may be used. The material may be metal or an alloy. Moreover, when the first electrode body is a negative electrode body, examples of materials can include materials of the current collector of a conventional negative electrode. The material can include nickel, copper, stainless steel (SUS304, SUS316, SUS316L, etc.) and the like. For example, as the porous conductive base material, Celmet (registered trademark) (manufactured by Sumitomo Electric Industries, Ltd.) or the like may be used.

A thickness of the porous conductive base material is, for example, 0.1 μm or thicker, or 1 μm or thicker. The thickness of the porous conductive base material is, for example, 1 mm or thinner, or 100 μm or thinner.

The positive-electrode slurry (electrode slurry) can be obtained by mixing and dispersing, in a solvent, a positive electrode mixture (electrode mixture) containing a positive-electrode active material (active material). The solvent used in this case is not particularly limited and may be appropriately selected depending on properties of the positive-electrode active material (active material). For example, a non-polar solvent such as heptane may be used. Various mixing/dispersion device such as an ultrasound dispersing device, a shaking device, or Fill mix (registered trademark) can be used for mixing and dispersing the positive electrode mixture (electrode mixture). A solid content in positive-electrode mixture paste (electrode mixture paste) is not particularly limited.

As the positive-electrode active material, a material that can release and store ions (for example, lithium ions) may be appropriately selected to be used. From the viewpoint of improving ionic conductivity (for example, lithium ionic conductivity), a solid electrolyte material may be optionally contained. In addition, in order to improve conductivity, a conductivity auxiliary agent may be optionally contained. Further, from the viewpoint of exhibiting flexibility, improving close contactability with the porous conductive base material, or the like, a binder may be optionally contained. As for the solid electrolyte material, the conductivity auxiliary agent, and the binder, it is possible to use a solid electrolyte material, a conductivity auxiliary agent, and a binder which are generally used in a solid-state battery.

The positive-electrode active material can be the same as that used as a positive-electrode active material of a common solid-state battery and is not particularly limited. Examples thereof can include a layered active material containing lithium, a spinel active material, an olivine active material, or the like. Specific examples of the positive-electrode active material include lithium cobaltate (LiCoO$_2$), lithium nickelate (LiNiO$_2$), LiNi$_p$Mn$_q$Co$_r$O$_2$ (p+q+r=1), LiNi$_p$Al$_q$Co$_r$O$_2$ (p+q+r=1), lithium manganate (LiMn$_2$O$_4$), heterogeneous element substitution Li—Mn spinel represented by LiMn$_{2-x}$M$_x$O$_4$ (x<2, and M is at least one element selected from the group consisting of Al, Mg, Co, Fe, Ni, and Zn), lithium titanate (oxide containing Li and Ti), lithium metal phosphate (LiMPO$_4$, M is at least one element selected from the group consisting of Fe, Mn, Co, and Ni), and the like.

Moreover, when the porous conductive base material 11a is dipped in a negative-electrode slurry such that voids of the porous conductive base material are filled with a negative-electrode active material contained in the negative-electrode slurry, a negative-electrode slurry instead of the positive-electrode slurry is used as the electrode slurry. The negative-electrode slurry can be obtained by mixing and dispersing, in a solvent, a negative-electrode mixture containing a negative-electrode active material.

The negative-electrode active material is not particularly limited as long as the negative-electrode active material can store or release lithium ions. Examples of the negative-electrode active material can include a lithium transition metal oxide such as lithium titanate ($Li_4Ti_5O_{12}$), transition metal oxide such as $TiO_2$, $Nb_2O_3$, and $WO_3$, metallic sulfide, metallic nitride, a carbon material such as graphite, soft carbon, and hard carbon, metallic lithium, metallic indium, a lithium alloy, and the like. In addition, the negative-electrode active material may have a powder shape or may have a thin-film shape.

Viscosity of the positive-electrode slurry (electrode slurry) is, for example, 2,000 mPa·s or higher, or 4,000 mPa·s or higher. Viscosity of the positive-electrode slurry (electrode slurry) is, for example, 10,000 mPa·s or lower, or 8,000 mPa·s or lower. By the Viscosity of the positive-electrode slurry (electrode slurry) being 4,000 mPa·s or higher and 8,000 mPa·s or lower, the voids of the porous conductive base material can be filled with the active material.

The porous conductive base material 11*a* is dipped into the positive-electrode slurry (electrode slurry) obtained as described above, and thereby a first electrode body 11 can be obtained (see (c) of FIG. 3).

A period of time during which the porous conductive base material 11*a* is dipped into the positive-electrode slurry (electrode slurry) is not particularly limited and is, for example, 10 seconds or longer, or 30 seconds or longer, for example. A period of dipping time is not particularly limited and is, for example, two minutes or shorter, or one minute or shorter.

When the porous conductive base material 11*a* is dipped into the positive-electrode slurry (electrode slurry), a temperature of the positive-electrode slurry (electrode slurry) is, for example, 20° C. or higher, or 25° C. or higher. When the porous conductive base material 11*a* is dipped into the positive-electrode slurry (electrode slurry), the temperature of the positive-electrode slurry (electrode slurry) is, for example, 35° C. or lower, or 30° C. or lower.

In addition, after the porous conductive base material 11*a* is dipped into the positive-electrode slurry (electrode slurry), the porous conductive base material to which the positive-electrode slurry (electrode slurry) is attached may be dried. The drying condition is not particularly limited; for example, the porous conductive base material is heated at a temperature of 50° C. or higher and 140° C. or lower, or at a temperature of 70° C. or higher and 120° C. or lower. Moreover, after drying, the first electrode body 11 may be pressed.

<Solid Electrolyte Material Coating Step>

In the solid electrolyte material coating step, the first electrode body 11 is dipped into solid-electrolyte slurry (see (d) of FIG. 3). Consequently, the first electrode body 11 is coated with a solid electrolyte material 12 (see (e) of FIG. 3). Moreover, the solid electrolyte material coating step in the method for manufacturing a solid-state battery of the disclosure is not limited to a case where the first electrode body is dipped into the solid-electrolyte slurry, and at least one of the first electrode body or the second electrode body may be dipped into the solid-electrolyte slurry.

The solid electrolyte material 12 can cause ionic conduction between the positive-electrode active material and the negative-electrode active material. The solid electrolyte material 12 is not particularly limited as long as the solid electrolyte material has ionic conductivity, and the solid electrolyte material having lithium ionic conductivity may be used. Examples of the solid electrolyte material can include a sulfide solid electrolyte material, an oxide solid electrolyte material, a nitride solid electrolyte material, a halide solid electrolyte material, and in particular, the sulfide solid electrolyte material may be used. The reason is that the sulfide solid electrolyte material has ionic conductivity higher than the oxide solid electrolyte material has.

Examples of the sulfide solid electrolyte material include $Li_2S$—$P_2S_5$, $Li_2S$—$P_2S_5$—LiI, and the like. Moreover, "$Li_2S$—$P_2S_5$" described above means the sulfide solid electrolyte material which is obtained using a raw material composition containing $Li_2S$ and $P_2S_5$, and the same applies to other description.

On the other hand, as the oxide solid electrolyte material, for example, a NASICON type oxide, a garnet-type oxide, a perovskite-type oxide, and the like can be used. The NASICON type oxide can include, for example, an oxide (for example, $Li_{1.5}Al_{0.5}Ti_{1.5}(PO_4)_3$) which contains Li, Al, Ti, P, and O. The garnet-type oxide can include, for example, an oxide (for example, $Li_7La_3Zr_2O_{12}$) which contains Li, La, Zr, and O. The perovskite-type oxide can include, for example, an oxide (for example, $LiLaTiO_3$) which contains Li, La, Ti, and O.

The solid-electrolyte slurry is prepared by dispersing the solid electrolyte material or the like in a solvent. The solvent is not particularly limited and may be appropriately selected depending on properties of the binder or the solid electrolyte material. A thickness (during drying) of the solid electrolyte material differs significantly depending on a configuration of the battery and is, for example, 0.1 μm or thicker and 1 mm or thinner, or 1 μm or thicker and 100 μm or thinner.

The first electrode body (positive electrode body) is dipped into the solid-electrolyte slurry obtained as described above, and thereby the solid electrolyte material 12 can be coated.

A period of time during which the first electrode body 11 is dipped into the solid-electrolyte slurry is not particularly limited and is, for example, ten seconds or shorter, or five seconds or shorter.

When the first electrode body 11 is dipped into the solid-electrolyte slurry, a temperature of the solid-electrolyte slurry is, for example, 20° C. or higher, or 25° C. or higher. When the first electrode body 11 is dipped into the solid-electrolyte slurry, a temperature of the solid-electrolyte slurry is, for example, 35° C. or lower, or 30° C. or lower.

In addition, after the first electrode body 11 is dipped into the solid-electrolyte slurry, the first electrode body to which the solid-electrolyte slurry is attached may be dried. The drying condition is not particularly limited and is 50° C. or higher and 140° C. or lower, or 70° C. or higher and 120° C. or lower.

<Solid-State Battery Laminating Step>

In the solid-state battery laminating step, the first electrode body coated with the solid electrolyte material and the second electrode body having a polarity different from the first electrode body are laminated and pressed. Consequently, it is possible to manufacture the solid-state battery cell 10 or the solid-state battery 1 in which a plurality of solid-state battery cells is laminated. Moreover, "the second electrode body having polarity different from that of the first electrode body" means that when the first electrode body is a positive electrode body, the second electrode body is a negative electrode body and means that when the first electrode body is a negative electrode body, the second electrode body is a positive electrode body.

When the second electrode body 13 is a negative electrode body, the second electrode body 13 contains at least a negative-electrode active material and a layer made of a negative-electrode current collector and a negative-electrode active material can be exemplified. From the viewpoint of improving ionic conductivity, the second electrode body may optionally contain a solid electrolyte material. In addition, in order to improve the conductivity, the second electrode body may optionally contain a conductivity auxiliary agent. Further, from the viewpoint of exhibiting flexibility and the like, the second electrode body may optionally contain a binder. As for the solid electrolyte material, the conductivity auxiliary agent, and the binder, it is possible to use a solid electrolyte material, a conductivity auxiliary agent, and a binder which are generally used in a solid-state battery.

The negative-electrode current collector is not particularly limited as long as the negative-electrode current collector has a function of performing power collection of a negative layer. Examples of materials of the negative-electrode current collector can include nickel, copper, stainless steel, and the like. In addition, examples of the shape of the negative-electrode current collector can include a foil shape, a plate shape, a mesh shape, and the like.

Similarly to the negative-electrode slurry described in the aforementioned electrode body filling step, the electrode slurry (negative-electrode slurry) which is used for forming the second electrode body can be obtained by mixing a negative-electrode mixture (electrode mixture) containing a negative-electrode active material (active material) in a solvent and dispersing the mixed product with an ultrasonic dispersion apparatus or the like. The electrode slurry is applied on a surface of the current collector, and then the second electrode body can be prepared through a drying process.

The solvent used in this case is not particularly limited and may be appropriately selected depending on properties of the negative-electrode active material and the like. The thickness of the negative electrode is, for example, 0.1 μm or thicker and 1 mm or thinner, or 1 μm or thicker and 100 μm or thinner. In addition, the negative electrode can be prepared through a pressing process. A pressure when the negative electrode is pressed is, for example, 200 MPa or higher, or about 400 MPa.

The first electrode body 11 according to the embodiment includes the porous conductive base material having a plurality of holes and the active material filled into the plurality of holes of the porous conductive base material, and the current collector and the active material layer are integrated. Therefore, there is concern that the second electrode body of one solid-state battery cell is inadvertently conducted with the solid electrolyte material coated on the first electrode body of another solid-state battery cell. Therefore, insulators 16 and 26 may be laminated between the solid-state battery cells 10, 20, and 30 including the first electrode bodies 11, 21, and 31 coated with the solid electrolyte materials 12, 22 and 32 and the second electrode bodies 13, 23, and 33, like the solid-state battery in FIG. 1. An electrode reaction is limited by the insulators 16 and 26, and it is possible to appropriately obtain electricity in the solid-state battery cells 10, 20, and 30.

Moreover, although the negative-electrode slurry is illustrated and described as the electrode slurry that forms the second electrode body, the electrode slurry may also be positive-electrode slurry in order to make the second electrode body a positive electrode body. In this case, the same positive-electrode slurry described in the electrode material filling step can be used.

<Solid-State Battery>

The solid-state battery 1 can be manufactured by the method for manufacturing a solid-state battery of the above-described embodiment. The solid-state battery 1 is a solid-state battery in which the first electrode body 11 and the second electrode body 13 are laminated, both surfaces of the first electrode body 11 in the lamination direction are coated with the solid electrolyte material 12, and the first electrode body 11 contains the porous conductive base material 11a having a plurality of holes and the active material filled into the plurality of holes of the porous conductive base material 11a.

According to the solid-state battery 1, it is possible to manufacture the solid-state battery in simple steps, and it is possible to effectively prevent shorting of the solid-state battery. Further, since both surfaces of the first electrode body 11 in the lamination direction are coated with the solid electrolyte material 12, there is an advantage that the first electrode body 11 can be protected.

Moreover, both surfaces of the first electrode body and the second electrode body in the lamination direction may be coated with the solid electrolyte material, like a solid-state battery 3 illustrated in FIG. 6. There is an advantage that the first electrode body and the second electrode body can be protected.

<Method for Manufacturing Solid-State Battery of Second Embodiment>

Hereinafter, a method for manufacturing a solid-state battery of another embodiment of the disclosure is described. Moreover, in the following description, the same description as that of the method for manufacturing a solid-state battery of the first embodiment is appropriately omitted.

FIG. 5 is a cross-sectional view illustrating an overview of a solid-state battery 2 according to the second embodiment. In the embodiment, the first electrode body (positive electrode body) is manufactured by the above described electrode filling step; however, the embodiment is characterized in that a surface of the second electrode body (negative electrode body) is coated with a solid electrolyte material instead of the first electrode body (positive electrode body).

As in the solid-state battery 2 of another embodiment of the disclosure, a surface of the second electrode body (negative electrode body) may be coated with a solid electrolyte material, the second electrode body being different from the first electrode body (positive electrode body) which includes a porous conductive base material having a plurality of holes and an active material filled into the plurality of holes of the porous conductive base material.

Insulators 46 and 56 are laminated between solid-state battery cells 40, 50, and 60. Consequently, it is possible to reduce irregularity in electrode reaction in the solid-state battery cells and to effectively inhibit local degradation of the battery.

<Method for Manufacturing Solid-State Battery of Third Embodiment>

FIG. 6 is a cross-sectional view illustrating an overview of a solid-state battery 3 according to a third embodiment. The embodiment is characterized in that surfaces of not only the first electrode body (positive electrode body) but also the second electrode body (negative electrode body) are coated with the solid electrolyte material.

As in the solid-state battery 3 of another embodiment of the disclosure, the surface of the first electrode body (positive electrode body) and the surface of the second electrode body (negative electrode body) may be coated with the solid electrolyte material. By coating with the solid electrolyte material, there is an advantage that the first electrode body 11 (positive electrode body) and the second electrode body (negative electrode body) can be protected.

Moreover, a method for coating the surface of the second electrode body (negative electrode body) with the solid electrolyte material can be the same method as the method for coating the surface of the first electrode body (positive electrode body) with the solid electrolyte material.

Insulators 76 and 86 are laminated between solid-state battery cells 70, 80, and 90. Consequently, it is possible to reduce irregularity in electrode reaction in the solid-state battery cells and to effectively inhibit local degradation of the battery.

<Method for Manufacturing Solid-State Battery of Fourth Embodiment>

FIG. 7 is a cross-sectional view illustrating an overview of a solid-state battery 4 according to a fourth embodiment. The embodiment is characterized in that no insulator is laminated between the solid-state battery cells, and a plurality of first electrode bodies 101 coated with a solid electrolyte material 102 and a plurality of second electrode bodies 103 coated with a solid electrolyte material 107 are alternately laminated so as to manufacture the solid-state battery.

The plurality of first electrode bodies 101 coated with the solid electrolyte material 102 and the plurality second electrode bodies 103 coated with the solid electrolyte material 107 are alternately laminated so as to manufacture the solid-state battery. Consequently, no insulator is laminated, and thus it is possible to manufacture a battery having higher energy density.

The disclosure provides a method for manufacturing a solid-state battery, the method including: an electrode material filling step of filling a plurality of holes of a porous conductive base material with an active material contained in an electrode slurry so as to form a first electrode body, by dipping the porous conductive base material having the plurality of holes into the electrode slurry; a solid electrolyte material coating step of coating a surface with a solid electrolyte material contained in a solid-electrolyte slurry by dipping at least one of the first electrode body or a second electrode body having a polarity different from that of the first electrode body into the solid-electrolyte slurry; and a solid-state battery laminating step of obtaining a solid-state battery by laminating and pressing the first electrode body and the second electrode body.

Consequently, it is possible to manufacture a solid-state battery in simple steps, and thus it is possible to effectively prevent shorting of the solid-state battery.

The solid electrolyte material coating step may be a step of coating the surface with the solid electrolyte material contained in the solid-electrolyte slurry by dipping the first electrode body and the second electrode body into the solid-electrolyte slurry.

The solid-state battery laminating step may be a step of obtaining the solid-state battery by alternately laminating and pressing a plurality of the first electrode body and the second electrode body.

The solid-state battery laminating step may be a step of laminating a plurality of solid-state battery cells configured of the second electrode body and the first electrode body coated with the solid electrolyte material and laminating insulators between the solid-state battery cells.

The disclosure provides a solid-state battery in which a first electrode body and a second electrode body having a polarity different from that of the first electrode body are laminated, both surfaces of at least one of the first electrode body or the second electrode body in a lamination direction are coated with a solid electrolyte material, and the first electrode body contain a porous conductive base material having a plurality of holes and an active material filled into the plurality of holes.

Both surfaces of each of the first electrode body and the second electrode body in the lamination direction may be coated with the solid electrolyte material.

As described above, the method for manufacturing a solid-state battery of the disclosure is a method for manufacturing a solid-state battery by which it is possible to manufacture the solid-state battery in simpler steps, and it is possible to effectively prevent shorting of the solid-state battery.

What is claimed is:

1. A method for manufacturing a solid-state battery, comprising:
   an electrode material filling step of filling a plurality of holes of a porous conductive base material with an active material contained in an electrode slurry so as to form a first electrode body, by dipping the porous conductive base material having the plurality of holes into the electrode slurry;
   a solid electrolyte material coating step of coating a surface with a solid electrolyte material contained in a solid-electrolyte slurry by dipping at least one of the first electrode body or a second electrode body having a polarity different from that of the first electrode body into the solid-electrolyte slurry; and
   a solid-state battery laminating step of obtaining a solid-state battery by laminating and pressing the first electrode body and the second electrode body.

2. The method for manufacturing a solid-state battery according to claim 1,
   wherein the solid electrolyte material coating step is a step of coating the surface with the solid electrolyte material contained in the solid-electrolyte slurry by dipping the first electrode body and the second electrode body into the solid-electrolyte slurry.

3. The method for manufacturing a solid-state battery according to claim 2,
   wherein the solid-state battery laminating step is a step of obtaining the solid-state battery by alternately laminating and pressing a plurality of the first electrode body and the second electrode body.

4. The method for manufacturing a solid-state battery according to claim 1,
   wherein the solid-state battery laminating step is a step of laminating a plurality of solid-state battery cells configured of the second electrode body and the first electrode body coated with the solid electrolyte material and laminating insulators between the solid-state battery cells.

5. The method for manufacturing a solid-state battery according to claim 2,
   wherein the solid-state battery laminating step is a step of laminating a plurality of solid-state battery cells configured of the second electrode body and the first electrode body coated with the solid electrolyte material and laminating insulators between the solid-state battery cells.

6. A solid-state battery in which a first electrode body and a second electrode body having a polarity different from that of the first electrode body are laminated,
   wherein both surfaces of at least one of the first electrode body or the second electrode body in a lamination direction are coated with a solid electrolyte material, and
   wherein the first electrode body contain a porous conductive base material having a plurality of holes and an active material filled into the plurality of holes.

7. The solid-state battery according to claim 6, wherein both surfaces of each of the first electrode body and the second electrode body in the lamination direction are coated with the solid electrolyte material.

* * * * *